July 3, 1951  A. CRESSWELL  2,558,732
METHOD OF PRODUCING STAPLE FIBER FROM POLYMERS
AND COPOLYMERS OF ACRYLONITRILE
Filed April 15, 1949  2 Sheets-Sheet 1

INVENTOR
ARTHUR CRESSWELL,
BY
Harold L. Kauffman
ATTORNEY

Patented July 3, 1951

2,558,732

UNITED STATES PATENT OFFICE 2,558,732

METHOD OF PRODUCING STAPLE FIBER FROM POLYMERS AND COPOLYMERS OF ACRYLONITRILE

Arthur Cresswell, Stamford, Conn., assignor to American Cyanamid Company, New York, N. Y., a corporation of Maine Application April 15, 1949, Serial No. 87,592

12 Claims. (Cl. 18—54)

This invention relates to the production of a staple fiber, and more particularly to a staple, synthetic fiber having a natural crimp (as distinguished from a mechanically produced crimp) which is made from polymers and copolymers of acrylonitrile. The invention is especially concerned with the production of a crimped, synthetic fiber from a soluble acrylonitrile polymerization product containing in the molecules thereof an average of at least about 85% by weight of acrylonitrile (combined acrylonitrile).

Various methods of producing filaments, films and other shaped articles from acrylonitrile (polymeric acrylonitrile) and from copolymers or interpolymers of a major proportion of acrylonitrile and a minor proportion of another monomer or monomers heretofore have been suggested. For example, in Rein U. S. Patent No. 2,117,210 it is proposed that polyacrylonitrile be dissolved in a quaternary ammonium compound such as benzyl pyridinium chloride, and that the resulting solution be employed in making films, threads and other shaped bodies therefrom. Also, in Rein U. S. Patent No. 2,140,921 it is proposed that various polyvinyl compounds including polyacrylonitrile and copolymers of acrylonitrile with another vinyl compound be dissolved in concentrated aqueous solutions of inorganic (metallic) salts, e. g., the chlorides, bromides, iodides, thiocyanates, perchlorates and nitrates, and that the resulting solutions be used in the manufacture of threads, films, etc. Various organic solvent solutions of polyacrylonitrile and copolymers of at least 85% by weight of acrylonitrile with another monomer are disclosed in U. S. Patents 2,404,713-728, and also the use of such solutions in forming films, filaments, etc., therefrom. In most of these latter patents the aforementioned Rein patents are referred to, as well as the difficulties encountered when effort was made to produce useful filaments and other shaped articles from polyacrylonitrile solutions of the kind proposed by Rein.

The invention disclosed and claimed in my copending application Serial No. 772,200, filed September 4, 1947, is based on my discovery that useful films, filaments, threads and other shaped articles, which are capable of being dyed, can be produced from acrylonitrile polymerization products of the kind described therein and in the aforementioned patents, as well as hereinafter, by precipitating or coagulating the polymerization product in approximately its desired shape from a water-coagulable solution thereof (e. g., concentrated aqueous salt solutions of the kind disclosed by Rein in his Patent No. 2,140,921), the precipitation being effected by contacting the said solution with a cold liquid coagulant comprising water, more particularly such a coagulant which is at a temperature not substantially exceeding +10° C. This coagulant is a non-solvent for the polymerization product but will dissolve the solvent in which the said product is dissolved. Surprisingly it was found that by keeping the temperature of the aqueous coagulating bath at or below +10° C., e. g., within the range of —15° C. to +10° C. and preferably at from about —15° C. to about +5° C., the precipitated gels in general are clear or substantially clear, tough, ductile and, in filament, thread or other form, can be stretched to orient the molecules, thereby increasing the cohesiveness, tensile strength, toughness, resilience and otherwise improving the properties of the finished product. In marked contrast, if temperatures materially above +10° C. be employed, e. g., temperatures of the order of 20° to 50° C. or higher, the precipitated gels in general are hazy or opaque, weak, friable, have little or no toughness or ductility and are not adapted for stretching to orient the molecules and thereby improve the properties of the dried material.

The invention disclosed and claimed in my aforementioned copending application Serial No. 772,200 is based on my further discovery that the shaped, precipitated gels, e. g., extruded, water-swollen monofilaments and multifilaments, which may be collectively designated as yarns or fibers, and which have been formed in a cold liquid coagulant comprising water at a low temperature of the order of that mentioned in the preceding paragraph, can be materially improved in properties by subjecting the precipitated material in wet, swollen state to tension, as by stretching, in contact with moisture or water and at an elevated temperature, specifically at a temperature within the range of about 70° C. to about 110° C. Advantageously water at 70° C. to 100° C., preferably at 90° C. to 100° C., is the fluid medium with which the gelled or precipitated fiber or other product is contacted during the stretching operation, but if temperatures above 100° C., e. g., 110° C., are desirable, then an atmosphere of saturated steam can be employed. For optimum results during stretching it is important that moisture or water be present. By thus wet stretching the precipitated product, more particularly to an extent at least twice its original length (that is, at least 100%) and preferably from 3 to 15 or 20 or more times its original length, the molecules are oriented along the fiber axis and a product having increased tensile strength, pronounced fibrillation, toughness, resilience and other improved properties is obtained.

The invention disclosed and originally claimed in my copending application Serial No. 68,370, filed December 30, 1948, and now abandoned in favor of my copending application Serial No. 73,078, filed January 27, 1949, as a continuation-in-part of said application Serial No. 68,370, is concerned with certain new and useful improvements in the process of producing yarns or fibers from polymers and copolymers of acrylonitrile as disclosed and claimed in my aforementioned copending application Serial No. 772,200 and more particularly to an improved process whereby the stretched, water-swollen or aquagel fiber of the acrylonitrile polymerization product can be continuously dried, or, preferably, both continuously spun, stretched and dried whereby a fiber or thread is obtained more quickly and with a minimum of handling so that the product is more uniform and is less subject to damage during processing than, for example, a package-spun fiber or thread. Specifically, the matter disclosed and originally claimed in my copending application Serial No. 68,370 is directed to a new and improved method of producing a synthetic fiber from a soluble, thermoplastic product of polymerization of a polymerizable mass comprising mainly acrylonitrile, which method comprises extruding the said polymerization product in the form of a fiber from a water-coagulable solution thereof and immediately after extrusion contacting the extruded mass with a liquid coagulant comprising water, the said coagulant being at a temperature not exceeding +10° C., thereby to precipitate the said product from the said solution as a stretchable gel; stretching the said gel in the presence of moisture and at a temperature within the range of about 70° C. to about 110° C.; applying a liquid (volatile liquid) composition, more particularly an aqueous dispersion, containing an anti-static agent (e. g., a guanylurea or a guanidine salt of a mono-aliphatic hydrocarbon ester of sulfuric acid, more particularly such a salt wherein the aliphatic hydrocarbon grouping contains from 12 to 18 carbon atoms, inclusive) to the stretched gel, that is, to the stretched fiber in gel state; and continuously drying the resulting gelled fiber while it is moving in a helical path, more particularly by causing the gelled fiber to move in a helical path in contact with a surface, specifically a smooth, rotating surface (e. g., a polished, stainless steel surface), at least a portion of which surface is heated to a temperature sufficiently high to dry the said fiber either substantially completely or to a desired degree. It is important that the gelled fiber be treated with an anti-static agent prior to drying, since otherwise the accumulation of static electricity on the dried fibers causes or tends to cause filament "ballooning" and makes it extremely difficult, if not impossible, to dry the wet, gelled fibers continuously with a degree of success that would meet practical operating requirements on a commercial scale.

The invention disclosed and claimed in my copending application Serial No. 73,078, filed January 27, 1949, involves a new and novel improvement, which was disclosed but not claimed in my aforementioned copending application Serial No. 68,370, and which consists in the step of stretching the gelled fiber of acrylonitrile polymerization product in the presence of moisture, at a temperature within the range of about 70° C. to about 100° C. and, also, while it is in a line which is tangent to two rotating circular surfaces and between which there is no other point of solid, frictional contact, the peripheral speed of one of the said rotating surfaces being greater than that of the other thereby to maintain the gelled fiber under tension. This step can be used in the process of the present invention. Among the advantages of this particular step in the production of a synthetic fiber from a water-coagulable solution of an acrylonitrile polymerization product may be mentioned the following:

The thread, during its stretching operation, may be subject to mechanical damage, i. e., filament breakage, abrasion, etc., as it comes in frictional contact with such devices as hooks, rollers or sheaves, which conventionally are used to submerge a thread in a bath. In accordance with the invention disclosed in my application Serial No. 73,078 such defects are obviated by using apparatus in carrying out the process which is so designed that there is no frictional contact on the thread during the critical stretching operation whereby the gelled fiber is oriented along the fiber axis.

Another novel feature of the invention disclosed in my aforementioned copending application Serial No. 73,078 involves the step of applying to the gelled fiber (that is, after coagulation of the solution containing the polymeric or copolymeric acrylonitrile in a bath of a cold liquid coagulant comprising water) a cold liquid treating agent comprising water while the said gelled fiber is moving in a helical path. This step also can be used in the process of the present invention. The liquid treating agent likewise should be at a temperature not exceeding +10° C., for example at a temperature within the range of −15° C. to +10° C., and preferably at a temperature of about 0° C. to about +5° C. This cold liquid treating agent, which is preferably composed of water at a low temperature such as has been mentioned before, is advantageously applied to the gelled fiber while the fiber is moving in a helical path in contact with a smooth rotating surface which likewise is at a temperature not exceeding +10° C. The rotating surface may take the form of a pair of cylindrical rolls upon which helices of the gelled fiber advance from the feed-on end to the take-off end. These rolls advantageously may be tilted at a suitable angle, for instance, at an angle of about 2° to about 10°, e. g., about 5°, and the liquid treating agent applied at the take-off end of one or both of the rolls whereby the fiber is countercurrently treated or washed with the treating or washing agent. By the application of, for example, cold water to advancing helices of the gelled fiber, any traces of water-soluble impurities which may be present in the fiber or on its exterior surfaces, such, for example, as traces of salts, solutions of which may have been used in dissolving the acrylonitrile polymerization product, will be removed from the gelled fiber prior to the stretching operation. The removal of traces of such water-soluble impurities is advantageous in that it permits optimum stretching of the gelled fiber with resulting improvement in the properties of the final product.

The final step of the process disclosed in my application Serial No. 73,078 comprises drying the stretched fiber. This may be done by conventional methods such as by drying at room temperature on a bobbin or other device on which the gelled fiber may have been collected; or drying may be effected continuously by the use of heated, convergent rolls such as are described in my aforementioned copending application Serial No. 68,370. Such a continuous drying operation comprises continuously drying the stretched gelled fiber, to which previously has been applied an aqueous composition containing an anti-static agent, by causing the fiber to move in a helical path, more particularly while it is in contact with a surface at least a portion of which is heated to a temperature sufficiently high to dry the fiber.

The present invention is directed to the production of a crimped, synthetic fiber from a soluble acrylonitrile polymerization product containing in the molecules thereof an average of at least about 85% by weight of combined acrylonitrile. The invention is based on my discovery that a staple fiber having a natural crimp can be produced by drying, in a fully relaxed state, discontinuous lengths of a molecularly oriented, shrinkable, aquagel fiber containing, by weight, from about 13% to about 75% (usually from about 40% to about 70%) of water and correspondingly from about 87% to about 25% (more particularly from about 60% to about 30%) of the aforementioned acrylonitrile polymerization product, for instance polymeric acrylonitrile, a copolymer of acrylonitrile and a lower alkyl acrylate (e. g., methyl, ethyl, propyl, isopropyl, butyl, isobutyl, sec.-butyl, tert.-butyl, amyl, etc.. acrylate, a copolymer of acrylonitrile and acrylamide, a copolymer of acrylonitrile and allyl alcohol, etc. which copolymers contain in the molecules thereof an average of at least about 85% by weight of combined acrylonitrile.

In order that a synthetic fiber may have widest utility in the textile art, it is important that the composition of the fiber be such that it can be produced with considerable crimp. Adequate crimp imparts to staple fibers the mass cohesion that is essential to satisfactory processing in the textile industry. Thus, crimp in a fiber is important in obtaining "loft" in yarns which are to be used in such articles as, for example, blankets, sweaters, flannels, half hose, etc. In the case of many synthetic fibers it is necessary to subject the fiber to mechanical processing in order to produce a crimped fiber, with obvious disadvantages both from cost and operating viewpoints. My invention provides a rapid and relatively inexpensive method of producing a synthetic fiber having a natural crimp, that is, a crimped fiber in which the crimp has not been imparted by mechanical deformation of the fiber. The invention also provides a textile material having improved properties, more particularly a naturally crimped (self-crimped), staple fiber of an acrylonitrile polymerization product. As a result of my invention, the field of utility of synthetic fibers is greatly widened, and especially the utility of fibers which are produced from an acrylonitrile polymerization product.

One method of preparing the staple fibers of the present invention comprises preparing a continuous, molecularly oriented, aquagel fiber by any of the methods disclosed in my aforementioned copending applications Serial Nos. 772,200, 68,370 and 73,078; cutting the continuous length of stretched (molecularly oriented), shrinkable, aquagel fiber into discontinuous lengths while the said fiber contains water and the aforesaid acrylonitrile polymerization product within the ranges mentioned in the preceding paragraph; and drying the discontinuous lengths of the cut fiber in a fully relaxed state thereby to obtain a crimped fiber of the said polymerization product. The molecularly oriented, aquagel fiber as ordinarily produced by the aforementioned processes usually contains between 60 and 70% by weight of water, more particularly about 65–67% by weight of water, when in equilibrium with liquid water at 25° C., but aquagel fibers containing 75% or more by weight of water can be employed. When a staple fiber having maximum crimp is desired, I prefer to cut the continuous aquagel fiber in its normal state, that is, without partially drying it prior to cutting it into discontinuous lengths. The degree of crimp and the general overall appearance of the staple fiber can be varied, however, by partially drying the continuous aquagel fiber, as normally produced, prior to the cutting operation. During such partial drying the continuous fiber is usually maintained in a taut condition, as by maintaining it under constant length. Drying should not be allowed to proceed to the point where the continuous fiber contains less than about 13% by weight of water prior to being cut into discontinuous lengths, which then are allowed or caused to dry substantially completely while in a fully relaxed state. If the aquagel fiber is dried to a point where it contains substantially less than about 13% by weight of water, the final product possesses either no crimp or only a slight crimp.

In accordance with one embodiment of my invention, a plurality of continuous lengths of spun, aquagel fiber or thread that has been stretched at least about 100% to orient the molecules along the fiber axis, that is, to cause the fibers to show by characteristic X-ray patterns orientation along the fiber axis, continuously is collected into the form of a continuous tow, and this tow of stretched, shrinkable, aquagel fiber is cut into discontinuous lengths while the said fiber contains an amount of water which is within the aforementioned percentage range. The discontinuous lengths of the cut tow are then dried in a fully relaxed state, e. g., by allowing them to dry at room temperature (20°–30° C.) or, preferably, by heating them at an elevated temperature, for instance at 40° or 50° C. to 120°–150° C. or even as high as 200° C. for a very short time.

In accordance with another embodiment of the invention, a plurality of continuous lengths of spun, unstretched, aquagel fiber is continuously collected in the form of a continuous tow, and this tow of stretchable, gelled fibers is then stretched at least about 100% in the presence of moisture and at a temperature within the range of about 70° C. to about 110° C., more particularly while passing through water maintained at a temperature of from about 70° C. to about 100° C. The stretched tow of continuous, shrinkable, aquagel fibers is then cut into discontinuous lengths while the tow contains, by weight, from about 13% to about 75% of water. The discontinuous lengths of the cut tow are then dried as described in the preceding paragraph, thereby to obtain a staple fiber of the acrylonitrile polymerization product, which fiber has a natural crimp.

If desired, the unstretched or stretched aquagel fiber can be treated with a composition containing an anti-static agent, either before or after it has been collected into the form of a continuous tow, after which the treated material is cut into discontinuous lengths and dried. Or, the anti-static treatment can be combined with the stretching operation by using an aqueous stretch bath containing an anti-static agent. Or, the discontinuous lengths of cut aquagel fiber can be treated with a composition containing an antistatic agent or they can be dyed prior to drying.

The novel features which are characteristic of my invention are set forth in the appended claims. The invention itself, however, will best be understood by reference to the following more detailed description when considered in connection with the accompanying drawing in which

Polymeric acrylonitrile and acrylonitrile copolymers containing in the molecules thereof an average of at least about 85% by weight of combined acrylonitrile are used in practicing the present invention. These acrylonitrile polymerization products are prepared by methods well known to those skilled in the art. In some cases the polymerization rates of the individual monomers in a polymerizable mixture may be different, with the result that the proportions of the components in the final copolymer are different from the proportions thereof in the mixture of monomers which is polymerized. In the copolymeric products which are used in practicing the present invention, the proportions of monomers in the polymerizable mixture from which the copolymers are made preferably are adjusted so that the final copolymer contains in the molecules thereof an average of at least about 85% by weight of combined acrylonitrile. The expression, "polymerization product containing in the molecules thereof an average of at least about 85% by weight of combined acrylonitrile" as used herein and in the appended claims, means a polymerization product (polymer, copolymer or interpolymer or mixture thereof) containing in its molecules an average of at least about 85% by weight of the acrylonitrile unit, which is considered to be present in the individual polymer molecule as the group or, otherwise stated, at least about 85% by weight of the reactant substance converted into and forming the polymerization product is acrylonitrile (combined acrylonitrile).

Illustrative examples of monomers which can be copolymerized or interpolymerized with acrylonitrile to yield a polymerization product (copolymer or interpolymer) containing in the polymer molecules an average of at least about 85% by weight of acrylonitrile are compounds containing a single $CH_2=C<$ grouping, for instance the vinyl esters and especially the vinyl esters of saturated aliphatic monocarboxylic acids, e. g., vinyl acetate, vinyl propionate, vinyl butyrate, etc.; vinyl and vinylidene halides, e. g., the vinyl and vinylidene chlorides and fluorides; allyl-type alcohols, e. g., allyl alcohol, methallyl alcohol and other unsaturated monohydric alcohols such as are disclosed, for example, in Pfann and Kropa copending application Serial No. 738,736, filed April 1, 1947; allyl, methallyl and other unsaturated monohydric alcohol esters of monobasic acids, e. g., allyl and methallyl acetates, laurates, cyanides, etc.; acrylic and alkacrylic acids (e. g., methacrylic, ethacrylic, etc.) and esters and amides of such acids (e. g., methyl, ethyl, propyl, butyl, etc., acrylates and methacrylates, acrylamide, methacrylamide, N-methyl, -ethyl, -propyl, -butyl, etc., acrylamides and methacrylamides, etc.); methacrylonitrile, ethacrylonitrile and other hydrocarbon-substituted acrylonitriles; unsaturated aliphatic hydrocarbons containing a single $CH_2=C<$ grouping, e. g., isobutylene, etc.; and numerous other vinyl, acrylic and other compounds containing a single $CH_2=C<$ grouping which are copolymerizable with acrylonitrile to yield thermoplastic copolymers. Alkyl esters of alpha, beta-unsaturated polycarboxylic acids also can be copolymerized with acrylonitrile to form copolymers which can be used in practicing the present invention. Examples of such esters are the dimethyl, -ethyl, -propyl, -butyl, etc., esters of maleic, fumaric, citraconic, etc., acids.

The proportions of monomers in the polymerizable mixture may be varied as desired or as may be required in order to obtain a polymerization product containing in the polymer molecules an average of at least about 85% by weight of acrylonitrile. Thus, when the polymerization rate of the monomers present in the polymerizable mixture is substantially the same, the proportions can be, for example, from, by weight, about 85% to about 99% of acrylonitrile to from about 15% to about 1% of the other comonomer. When the polymerizable mixture contains, in addition to the acrylonitrile, a monomer such, for example, as vinyl chloride, allyl alcohol, etc., which polymerizes at a rate different from that of acrylonitrile, then it may be necessary to subject to polymerization conditions a mixture in which the acrylonitrile constitutes as little as, for instance, 50 or 60% by weight thereof in order to obtain a polymerization product containing in the copolymer molecules an average of at least about 85% by weight of combined acrylonitrile.

Any suitable method of polymerizing the monomeric acrylonitrile or mixture of monomers may be employed. One suitable method comprises polymerizing the monomer or mixture of monomers in an aqueous emulsion using a suitable polymerization catalyst, e. g., ammonium persulfate. Other polymerization methods, however, also may be used, e. g., methods such as those described in Bauer et al. Patent No. 2,160,054. The polymeric and copolymeric acrylonitriles which are used in practicing the present invention may be of any suitable molecular weight, but ordinarily the molecular weight (average molecular weight) is within the range of 15,000 to 300,000 or higher and advantageously is within the range of about 50,000 to about 150,000, as calculated from viscosity measurements using the Staudinger equation (reference: U. S. Patent No. 2,404,713).

The polymeric or copolymeric acrylonitrile is then dissolved in a solvent from which the polymer (or copolymer) is precipitated or coagulated when the solution is brought into contact (e. g., immediately after extrusion) with a liquid coagulant comprising water, more particularly water which is at a temperature not exceeding substantially +10° C., preferably at or below +5° C., e. g., at from −10° C. to +5° C. Examples of such solvents are concentrated aqueous solutions of water-soluble inorganic salts, more particularly such salts which yield highly hydrated ions in aqueous solution, e. g., the chlorides, bromides, iodides, thiocyanates, perchlorates and nitrates, which salts are disclosed in the aforementioned Rein Patent No. 2,140,921 and the concentrated aqueous solutions of which are the preferred solvents for the acrylonitrile polymerization product, more particularly such a product containing in the molecules thereof an average of at least about 85% by weight of combined acrylonitrile, in carrying the present invention into effect. Saturated or nearly saturated aqueous solutions of such salts in some cases may be used. More specific examples of such water-soluble inorganic salts are zinc chloride, calcium chloride, lithium bromide, cadmium bromide, cadmium iodide, sodium thiocyanate, zinc thiocyanate, aluminum perchlorate, calcium perchlorate, calcium nitrate, zinc nitrate, etc. Other examples of suitable solvents are concentrated aqueous solutions of guanidine thiocyanate, the mono-(lower alkyl)-substituted guanidine thiocyanates and the symmetrical and unsymmetrical di-(lower alkyl)-substituted guanidine thiocyanates. These solutions containing dissolved polymeric or copolymeric acrylonitrile are more fully described and are specifically claimed in my copending application Serial No. 772,201, filed September 4, 1947, now Patent No. 2,533,224, issued December 12, 1950. I prefer to use a concentrated aqueous solution of calcium thiocyanate as the solvent for the acrylonitrile polymerization product.

Figures 1, 2:
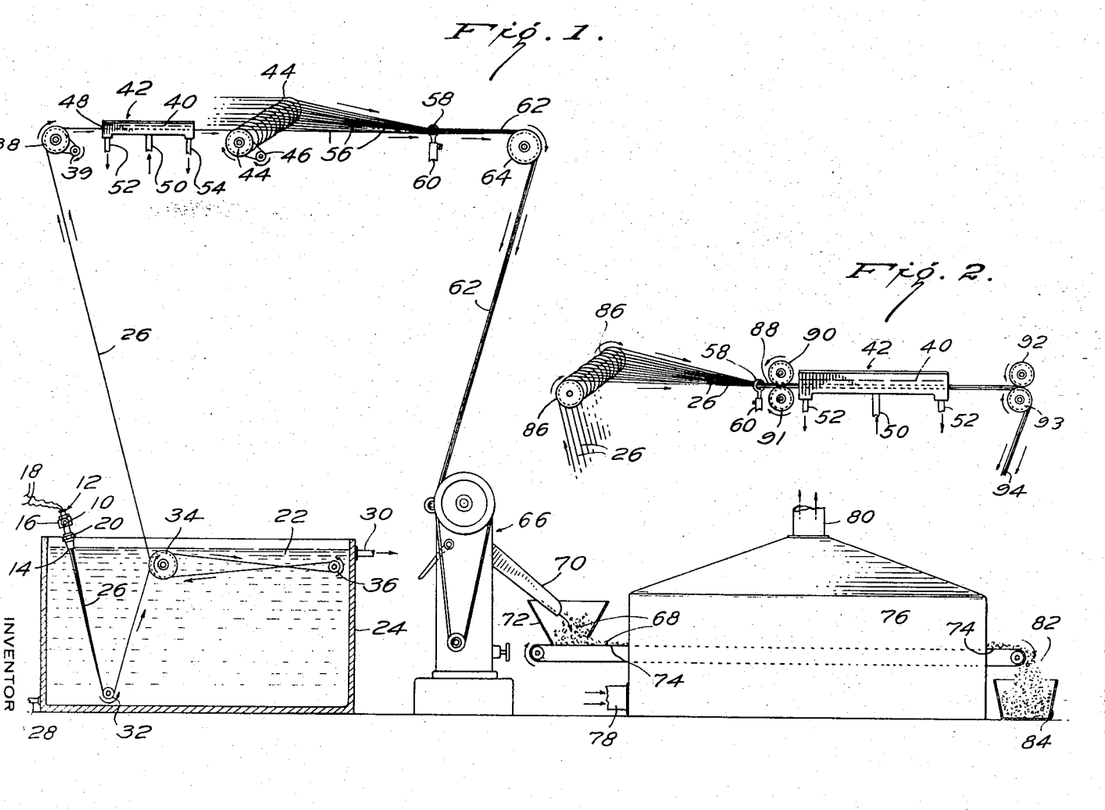
Fig. 1 is a somewhat diagrammatic view of one form of apparatus that can be used in practicing the invention and illustrative thereof.
Fig. 2 is a similar view of a portion of apparatus illustrating another embodiment of the invention.

With reference to the accompanying drawing and more particularly to Fig. 1 thereof, a water-coagulable solution of the polymeric or copolymeric acrylonitrile, which has been filtered (if necessary) and de-aerated, is passed under pressure from a supply reservoir (not shown) through the conduit 10 into a spinneret coupling or heading 12, which preferably is designed so that the solution can be heated, e. g., by electrical, hot water, steam or other means, prior to extrusion through the spinneret 14. A suitable design of a spinneret coupling, which is heated by electrical means, is shown in Fig. 2 of the drawing accompanying my aforementioned copending application Serial No. 772,200. The device there illustrated, and portions of which will be described herein with reference to Fig. 1 of the present drawing, comprises a male coupling 16 in which is annularly spaced an electrically heated cartridge provided with lead-in wires 18. This cartridge advantageously may be fitted in the male coupling 16 by means of a liquid-tight plug. The electrically heated cartridge is so positioned as to project beyond the lower end of the male coupling 16 and into the cup of the spinneret 14, which is attached by means of female coupling 20. The solution being charged through conduit 10 passes annularly between the outer wall of the cartridge and the inner wall of the male coupling 16 and thence into the spinneret 14. Since the electrically heated cartridge projects into the cup of the spinneret, the solution is maintained at an elevated temperature prior to extrusion. The temperature of the solution may be varied as desired or as conditions may require, but ordinarily will be within the range of 60° C. to 100° C. By heating the solution immediately prior to extrusion, its viscosity is materially reduced and a substantial reduction in operating pressure is effected. Furthermore, by increasing the fluidity of the solution at the point of extrusion, the water-swollen or gelled filaments can be pulled from the spinneret at a greater speed, thereby increasing the amount of fiber or yarn that can be produced from a particular unit.

The spinneret coupling 12 may be held by suitable means (not shown) above the cold aqueous coagulating or precipitating bath 22 in vessel 24 at any convenient angle. For example, the spinneret coupling may be positioned at less than a 90° angle to the surface of the aqueous coagulating bath 22 as shown in Fig. 1 of the drawing accompanying the present application or at approximately a 90° angle to the surface of the said bath as shown in Fig. 1 of the drawing of my aforementioned copending application Serial No. 772,200. The coupling preferably is positioned so that only the face of the spinneret contacts the coagulating bath.

As the solution is forced under pressure through the openings in the spinneret, it coagulates or precipitates in the form of solid, water-swollen or gelled filaments or fiber 26 upon entering the coagulating bath 22, which is maintained at a temperature not exceeding substantially +10° C. by any suitable means. For example, water may be refrigerated or cooled to the desired low temperature and circulated through the vessel 24, being introduced through the conduit 28 and withdrawn through the conduit 30. Alternatively, and as shown in Fig. 1 of the drawing accompanying my aforementioned copending application Serial No. 772,200, cooling coils through which is circulated a liquid coolant, e. g., a refrigerated brine solution, may be employed to maintain the bath 22 at the desired low temperature. It will be understood, of course, that various other means may be used to keep the bath 22 at or below +10° C. For instance, instead of employing means such as mentioned above, I may add ice alone to the bath, or a mixture of ice and sodium chloride or other salt, or ice and methyl or ethyl alcohol, or other suitable temperature depressants or mixtures thereof in order to reduce the bath of liquid coagulant comprising mainly water to the desired low temperature.

The coagulated fiber in gel state is led through the bath 22, which preferably is of the circulating type, by any suitable means.

The gelled fiber may be led through the bath 22 merely with the aid of a guide roll or sheave 32 to facilitate the passage of the fiber through the coagulating bath, as is shown in Fig. 1 of the drawing accompanying my aforementioned copending application Serial No. 772,200. Advantageously, however, the gelled fiber is led through the bath 22 with the aid of a submerged, power-driven godet 34 and multi-groove roll 36. For instance, the gelled fiber may be led through the bath 22 and out of it, as is shown in Fig. 1 with the aid of guide roll 32, power-driven godet 34 and multi-groove roll 36. The gelled fiber is wrapped several times between the godet 34 and the multi-groove roll 36. This arrangement permits a long bath travel by multiple winds of synthetic fiber, without causing excessive tension on the fiber, such as may occur when a pair of multi-groove rollers alone is used in leading the fiber through the bath.

It is important that the coagulating bath 22 be at a temperature not exceeding substantially +10° C., and preferably at or below +5° C., e. g., −10° C. to 0° C. or +1° or +2° C. Temperatures below −15° C., e. g., −20° C. or lower, may be employed if desired, but such temperatures are more costly to secure and maintain, and no particular advantages appear to accrue therefrom. By the use of a low-temperature, aqueous coagulating bath as herein described, the shaped, coagulated or precipitated material, more particularly an extruded, water-swollen or gelled fiber or thread, is clear (transparent) or substantially clear, cohesive, has considerable elasticity and toughness, and is capable of being oriented, e. g., by stretching. In marked contrast, when the aqueous coagulating bath is substantially above +10° C., e. g., +20° C. or +25° C. or higher, the resulting fiber or thread usually either is opaque or shows considerable haze, is spongy and has little or no mechanical strength. Furthermore, it is either unstretchable or has a low order of stretchability, yielding on drying a brittle fiber or thread which cannot be used for textile purposes.

Furthermore, when multifilaments are produced with the aid of a low-temperature coagulating bath as herein described, the individual water-swollen or gelled filaments show no tendency to stick together. This was quite surprising and unexpected, as was also the fact that the swollen or gelled products could be washed substantially free of salt without difficulty, even in a cold coagulating bath, especially in view of the fact that these discoveries are directly contrary to the prior art teachings. For example, in Patent No. 2,404,716 and in numerous other patents it is stated that it has been found substantially impossible to use the solutions proposed in Rein Patent No. 2,140,921 in the production of yarns and films, and that their extrusion into coagulating baths, including such non-solvents for polyacrylonitrile as water, dilute acid solutions, dilute salt solutions, etc., results in the formation of shaped articles that contain large amounts of the inorganic salt component of the solvent. The prior art also teaches that these salts are distributed throughout the structure, that the latter possesses poor physical properties and that the removal of these salts, when possible, results in the formation of a porous, spongy, weak, undesirable structure that is very brittle and completely unsuited for use as a yarn or film. The prior art further teaches that when an attempt is made to form a multifilament yarn by extruding an aqueous sodium sulfocyanide (sodium thiocyanate) polyacrylonitrile composition into a dilute acid bath, the individual filaments that are obtained stick together to form an essentially monofilament structure which is extremely brittle and cannot be bent or worked without breaking. In marked contrast the synthetic fibers obtained by practicing the present invention are substantially free from salts, are tough and ductile even when first coagulated in the spinning or precipitating bath, and the individual filaments show no tendency to stick together when extruded through a spinneret into the cold aqueous bath.

Figure 3:
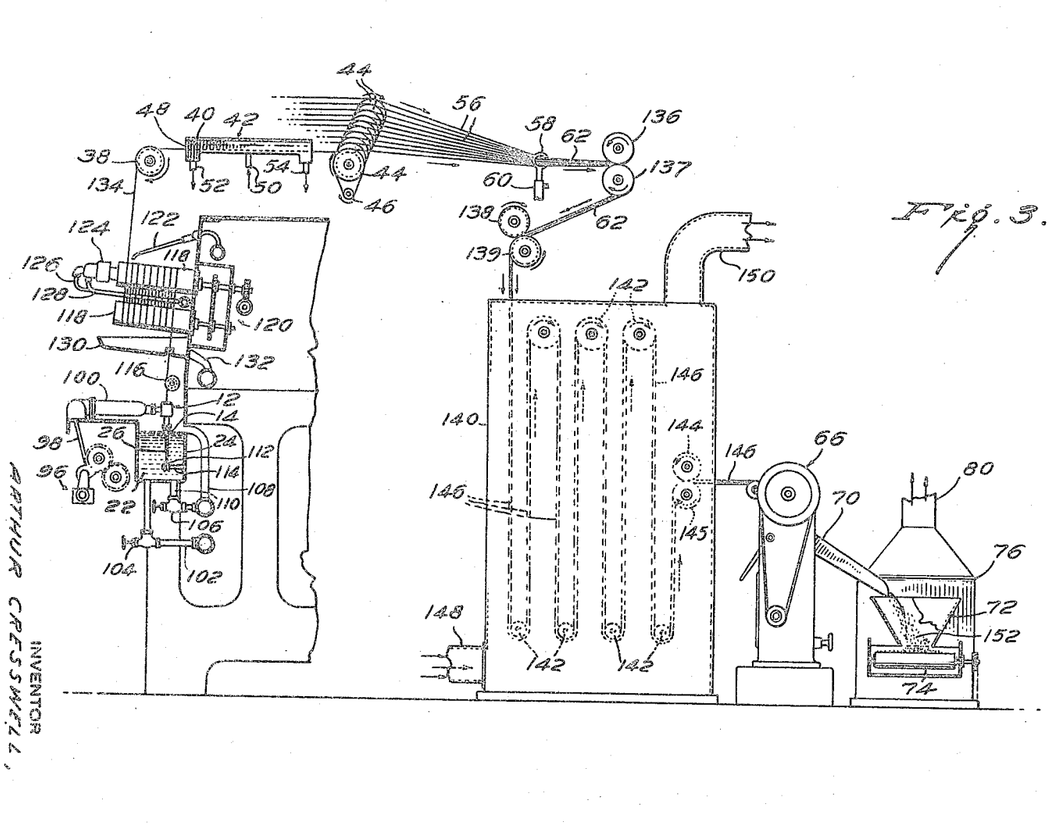
Fig. 3 is a somewhat diagrammatic view of another form of apparatus that can be used in carrying the invention into effect and illustrative thereof.

In carrying the present invention into effect the spun fibers are treated after leaving the coagulating bath in order to orient the molecules and thereby to increase the tensile strength and otherwise to improve the properties of the spun material. Orientation is preferably effected by stretching the fiber, while still in its water-swollen or gel state, in the presence of moisture and at a temperature within the range of about 70° C. to about 110° C., more particularly at a temperature of about 90° C. to about 100° C. This stretching may be effected, for example, in the manner illustrated in Fig. 1 of my aforementioned copending application Serial No. 772,200 or, preferably, as illustrated in Figs. 1 and 3 of the drawing accompanying the instant application. Alternatively, in carrying the present invention into effect, a plurality (e. g., from 2 to 100 or more) of continuous lengths of the stretchable, aquagel fiber 26 may be continuously collected in the form of a continuous tow, and this continuous tow then may be continuously stretched to orient the molecules of the individual fibers along the fiber axis, as shown by way of illustration in Fig. 2 of the present application.

With reference to Fig. 1 of the drawing of the present application, the fiber 26 after leaving the aqueous coagulating bath 22 passes over the revolving wheel or godet 38 and the auxiliary roller 39, being wrapped one or more (e. g., two or three) times about each, into the hot aqueous liquid medium 40, e. g., hot water, contained in the stretch trough 42, and thence over the godet 44 and the auxiliary roller 46, about each of which the fiber also is wrapped one or more (e. g., two or three) times. The peripheral speed of the godet 38 may be slightly greater than that of the godet 34. The godet 44 is caused to revolve at a peripheral speed greater than that of the godet 38; in other words, the surface speed of the godet 44 is such that the ratio of speeds of godets 38 and 44 is proportional to the desired stretch which is to be applied to the fiber as it passes through the hot aqueous liquid medium 40.

The amount of stretch that is applied to the water-swollen or gelled fiber may be varied widely, but in all cases should be sufficient to cause at least appreciable orientation of the molecules and an improvement in the properties of the fiber undergoing treatment. The amount of tension to which the fiber is subjected obviously should not be so great as to cause the fiber to break. Depending, for example, upon the type of material being stretched or elongated and the particular properties desired in the finished product, the amount of stretch may vary, for instance, from 100%, preferably from 200 or 300%, up to 2000% or more of the original length of the fiber.

The stretch trough 42 illustrates one suitable form of apparatus which may be used in the stretching operation. More detailed views of this trough are shown in Figs. 5, 6 and 7 of the drawing accompanying my aforementioned copending application Serial No. 68,370 (now abandoned), and it is broadly and specifically claimed in my copending application Serial No. 146,880, filed February 28, 1950, as a division of the aforesaid abandoned application Serial No. 68,370. This trough is positioned between the godets 38 and 44 so that the fiber 26, which is tangent to the tops of the godets, is slightly above (e. g., about ⅛ inch above) the bottom of a V-shaped trough portion as it passes through the hot aqueous liquid medium contained in the trough 42. The fiber 26 enters the stretch trough 42 slightly above the bottom portion of the U of a U-shaped slot in end wall 48 of the trough. The hot aqueous liquid medium in which the fiber is stretched is preferably circulated through the trough 42, entering the trough through the conduit 50 and leaving through the conduits 52 and 54. As is shown in Figs. 5, 6 and 7 of my application Serial No. 68,370, the V-shaped trough portion is provided with a series of openings in the bottom of the trough and in each of the sides forming the V. The hot aqueous liquid medium 40 entering the stretch trough 42 through the conduit 50 is forced through the aforementioned openings, thereby mildly agitating the hot aqueous liquid in the trough. The liquid medium 40 flows along the V-shaped trough portion into collecting reservoirs located at each end of the stretch trough 42, from which reservoirs it then passes through the conduits 52 and 54 to a supply reservoir (not shown).

The hot aqueous liquid medium 40 which is circulated through the trough 42 may be heated by any suitable means (not shown) to the desired temperature. For example, the water or other aqueous liquid medium employed may be heated electrically, or by gas, steam or other means, in a suitable heating unit having a supply reservoir and connecting conduits to and from the stretch trough 42 for circulation of the hot aqueous liquid medium between the supply reservoir and the stretch trough. To conserve heat and in order better to maintain the temperature of the aqueous liquid in the stretch trough, it is usually desirable to insulate the trough with suitable heat-insulation, e. g., glass fibers, asbestos, cork, etc., in board, sheet, tape or other form in which these materials are available for use as heat insulation. A suitable cover (not shown), which may be hinged or which merely may fit loosely over the top of the trough and is removable therefrom, also advantageously may be provided in order to reduce heat losses and to provide a better control of the temperature of the hot aqueous liquid in the stretch trough. Such a cover likewise is preferably insulated with a suitable insulating material such as one or another of those mentioned above by way of illustration. The cover is raised or removed (if detachable from the trough) when "threading-up" the apparatus, and is closed or put back into place after the thread has been positioned in the stretch trough.

Among the advantages of using a stretch trough of the kind described above may be mentioned the following:

The thread, during the stretching operation, may be subject to mechanical damage, i. e., filament breakage, abrasion, etc., if it comes in frictional contact with such devices as hooks, rollers or sheaves, which conventionally are used to submerge a thread in a bath. The above-described device avoids this defect by having no frictional contact on the thread during this critical operation. Another advantage accrues by reason of the slight lift imparted to the thread by the multitude of small jets of water under the thread, thereby preventing any possible sag and contact of the thread with the bottom of the trough.

After leaving the stretch trough 42 and passing over the godet 44 and auxiliary roller 46, the stretched, oriented (molecularly oriented), gelled fiber 56 and one or more (e. g., from 2 to 100 or more) of other continuous lengths of similarly produced, oriented, aquagel threads or fibers are continuously collected by means of the collecting ring 58 attached to the ring holder 60 into the form of a continuous tow 62.

The stretched, undried, aquagel fibers as ordinarily produced contain between about 60% and about 75% (±1 or 2%), more particularly between 65% and 70%, by weight of water, the remainder consisting essentially of the oriented acrylonitrile polymerization product. In some cases it may be desirable to reduce the moisture content of the continuous lengths of wet fibers prior to cutting into discontinuous lengths. This can be done, for example, by partly drying the tow of wet fibers until it contains not less than about 13% by weight of water in the manner described more fully hereafter.

Referring again to Fig. 1, the continuous tow 62 is led over the guide roller 64 to the cutter 66. Any suitable device can be used for cutting the tow 62 into discontinuous lengths of aquagel fiber 68 (wet, staple fiber), e. g., a rotary fiber cutter of conventional or of modified design, or other fiber-cutting device now available to the trade. The continuous tow can be cut to yield fibers of any desired length such, for example, as from ½ inch to 8 inches (or longer). The cut fiber passes through the discharge trough 70 into a hopper 72, from which the cut fiber 68 falls upon a continuous belt 74 which carries the cut fiber through the drying oven 76, wherein the fiber is dried substantially completely in a fully relaxed state.

Any suitable means may be employed for drying the cut fiber in the oven 76. For example, the oven may be provided with electrical resistance coils as a source of heat; or, the fiber may be dried by introducing a hot gaseous medium, e. g., hot air, hot flue gases, etc., into the oven. Such gases are introduced into the oven through the conduit 78 and are discharged from the oven, together with moisture evaporated from the cut fiber, through the conduit 80. During drying in a fully relaxed state, the cut fibers shrink and develop a crimp. The dried, crimped fibers or staple 82 fall from the discharge end of the belt 74 into the receptacle 84.

Alternatively, the cut fiber 68 can be dried by blowing in suspension in a current of hot air.

The crimped staple fibers resulting from the method of my invention are resistant to attack by moths, carpet beetles, silver fish, mildew, etc. The crimp is permanent, and is not removed by washing with hot water. The staple, as well as textiles fabricated therefrom, have high wet-strength characteristics and, therefore, good washability. The crimped, staple fiber is eminently suitable for spinning into wool-like yarn, from which in turn can be fabricated textiles such as blankets, carpets, knit garments, spun fabrics such as worsteds or, in general, any fabric in which a lofty, wool-like character is desirable. Such fabrics are moth-resistant and mildew-resistant and have good washability. The dried, crimped, staple fiber 82 also can be blended in any proportions with other fibers, e. g., nylon, acetate and viscose rayon staple fibers, cotton, wool, flax, casein fiber, etc., to alter or improve the properties of fabrics made from the mixed staple. The weather-resistance of the crimped, staple fibers makes them especially adapted for use in the fabrication of textiles which may be exposed to outdoor wear, e. g., men's and women's outerwear, sportswear such as shirts, slacks, etc. The crimped staple has a warm, wool-like hand, exceptional bulking power, and high thermal insulating characteristics. Other outstanding properties of fabrics made from the staple include their ready recovery from wrinkling, the relative ease with which they can be laundered and dry cleaned, and their dimensional stability in high humidity.

Fig. 2 illustrates a different embodiment of the invention wherein a plurality (e. g., from 2 to 100 or more) of continuous lengths of the stretchable, gelled fiber 26 are first collected in the form of a continuous tow, and this tow of fiber is then stretched at least about 100% as described above with reference to Fig. 1.

As illustrated in Fig. 2 and wherein the same parts or products have been numbered the same as corresponding parts or products shown in Fig. 1, a plurality of continuous lengths of fibers 26 from a plurality of aqueous coagulating baths, e. g., a bath such as designated by 22 in Fig. 1, are led over the guide rolls 86 and thereafter are collected in the form of a continuous tow 88 of unstretched, aquagel fibers by means of the collecting ring 58 attached to the ring holder 60. The tow 88 passes between the pinch rollers 90 and 91, thence through the stretch trough 42 and thereafter between the pinch rollers 92 and 93. The pinch rollers 90, 91, and 92, 93 are so adjusted as to impart the desired degree of stretch to the tow 88 as it passes through the hot aqueous medium 40 in the stretch trough 42. In order to prevent slippage of the tow on the two pairs of pinch rolls, the tow may be wrapped one or more times around either or both of the lower rolls 91 and 93, which are positively driven rolls. The peripheral speed of roll 93 may be from 2 to 15 or more times the peripheral speed of roll 91 thereby to impart the desired stretch to the aquagel tow. The upper rolls 90 and 92 may either be weight loaded and, therefore, driven by the respective lower rolls 91 and 93, or they may be positively driven and have a spring loading to accomplish the desired pinch on the tow. In general, the extent and conditions of stretching the tow 88 are the same as described above with reference to the stretching of the fiber 26 as illustrated in Fig. 1. The stretched aquagel tow 94 is then cut and dried as has been described above with reference to the tow 62 (Fig. 1), or it can be partly dried to a point where it contains not less than about 13% by weight of water, generally not less than about 30 or 40% by weight of water, and the partly dried tow then cut into discontinuous lengths, followed by drying to yield a crimped, staple fiber. This embodiment of the invention (partial drying prior to cutting, followed by complete drying of the cut fibers in a fully relaxed state) is described more fully hereafter with reference to Fig. 3.

With reference to Fig. 3 of the accompanying drawing and wherein the same parts or products also have been numbered the same as corresponding parts or products shown in Figs. 1 and 2, a water-coagulable solution of the polymeric or copolymeric acrylonitrile, which has been filtered (if necessary) and de-aerated, is supplied by a manifold pipe to a metering pump 96, which forces the solution through the conduit 98 and thence through the candle filter 100 to the vertically positioned spinneret coupling or heading 12. This spinneret coupling preferably is designed so that the solution can be heated, e. g., by electrical, hot water, steam or other means, prior to extrusion through the spinneret 14, as has been described more fully hereinbefore with reference to Fig. 1. Instead of using an electrically heated cartridge, by means of which the solution entering the spinneret coupling shown in Fig. 1 is heated, the solution entering the spinneret coupling 12 (Fig. 3) may be preheated by a steam-heated inner tube around which the solution flows annularly, thereby to reduce the viscosity of the spinning solution at the point of extrusion. Such a steam-heated inner tube is employed in preheating the spinning solution which enters the spinneret coupling forming a part of the apparatus shown by way of illustration in Fig. 3.

The spinneret coupling 12 may be held by any suitable means, for example by being attached to the delivery end of the filter 100, above the cold aqueous coagulating or precipitating bath 22 in vessel 24 at any convenient angle as has been described hereinbefore with reference to Fig. 1.

The solution is forced under pressure through the openings in the spinneret 14, whereupon it coagulates or precipitates in the form of solid, water-swollen or gelled filaments or fiber 26 upon entering the coagulating bath 22, which is maintained at a temperature not exceeding substantially $+10°$ C. by any suitable means such as those described above with reference to Fig. 1 by way of illustration. For example, refrigerated water may be introduced into the vessel 24 through supply line 102 upon opening valve 104. Valve 106 is closed upon charging a refrigerated liquid coagulant comprising water to vessel 24 in order to fill the latter. The overflow of cold liquid coagulant from vessel 24 flows from the top of the vessel through conduit 108 and, if desired, may be returned to the vessel through conduit 110 by opening valve 106; or, it may be returned to the refrigeration system for further refrigeration and recirculation through vessel 24; or, it may be led to an evaporating system for concentration and reuse as a solvent in dissolving the acrylonitrile polymerization product.

The coagulating fiber in gel state is led through the bath 22, which preferably is of the circulating type, by any suitable means. In the embodiment of the invention shown in Fig. 3, the water-swollen or gelled fiber 26 is led downwardly to a submerged roller 112, which may be positively driven, and thence to the surface. This roller may be conveniently mounted on a removable bracket 114 for ease in changing rollers.

Upon emerging from the coagulating bath 22 the fiber 26 passes over a guide roller 116 and thence to a pair of converging hollow drums or rolls 118. These rolls are positively driven by a suitable driving mechanism 120 and are suitably spaced from each other, e. g., 6 or 8 inches or more. They are suspended in the same vertical plane and are caused to rotate at the same peripheral speed. The rolls are slightly inclined (i. e., converge) toward each other at the delivery end, thereby to advance the thread over the rolls. The degree of convergency may be varied as desired or as conditions may require in order to advance the thread in a plurality of helices over the rolls. Either one or both rolls may converge slightly toward each other, the degree of convergency being shown in an exaggerated manner in Fig. 3. With rolls 4 inches in diameter and 10 inches long, satisfactory results ordinarily are obtained by having the lower roll convergent to the upper roll, at the delivery end, by an angle of about 0.6°. The diameter and length of the rolls may be varied as desired or as conditions may require, but ordinarily they are such that, during operation, the length of thread being washed with cold liquid treating agent comprising water while the said thread is continuously moving in a helical path is from about 5 yards to about 40 yards.

If desired, both rolls may be tilted at a suitable angle to the horizontal, e. g., at an angle of about 2° to 10°, more particularly at an angle of about 5°, to the horizontal. By tilting the rolls at a substantial angle to the horizontal, the thread advancing along the rolls from the feed-on end to the take-off end meets a countercurrent stream of the cold liquid treating agent comprising mainly water, e. g., water itself, at a temperature not higher than $+10°$ C. and preferably at a temperature within the range of about 0° C. to $+5°$ C. This cold liquid treating agent is applied to the advancing helices of thread or fiber from the jet 122.

To prevent the ice water or other cold liquid coagulant comprising water from warming up excessively as it runs along the surfaces of the rolls, a suitable refrigerant advantageously may be introduced into either one or both of the hollow cylinders or rolls 118, thereby to maintain the exterior surface of the roll in contact with the thread at a temperature not higher than +10° C., more particularly within the range of about —15° C. to about 0° or +5° C. This refrigerant may be, for example, chilled brine, which is circulated through either one or both rolls through rotary joint 124, the brine entering the roll through conduit 126 and being discharged through conduit 128. In the embodiment of the invention shown in Fig. 3 the upper roll only is shown as being provided with means for introducing a chilled brine solution in order to keep the temperature of the roll itself at the desired low point. The wash water or other liquid treating agent comprising mainly water which is applied to the advancing helices of fiber in this manner drips off the rolls into a collector tray or basin 130, which is positioned immediately below the rolls, and from which the liquid flows into a return line 132 and thence, for example, back to coagulating bath 22 (after being refrigerated if necessary) or to a suitable recovery system.

The rolls 118 may be made of any suitable material such, for example, as Monel metal, stainless steel, aluminum, anodized aluminum, chromium-plated copper, chromium-plated steel, dense graphite, fused quartz, glass, resin-impregnated glass-fiber laminate, etc. The rolls are preferably made of a material which is a good thermal conductor, that is, a material which will permit the rapid transfer of cold from the interior surfaces to the external surfaces of the cold rolls. The rolls may be made of one base material, which then may be plated or otherwise covered with a smooth layer of another material, e. g., a chrome plating. The rolls 118 are preferably made of, or surfaced with, a corrosion-resistant material.

The application of cold water to advancing helices of the gelled fiber facilitates the removal of traces of any water-soluble impurities which may be present in the gelled structure or on the exterior surface of the fiber. By using treating rolls such as shown in Fig. 3 and applying cold water or other cold liquid treating agent comprising water to advancing helices of the fiber, any traces that may be present of salt are removed from the fiber prior to the stretching operation. This is advantageous in that it permits optimum stretching of the gelled fiber with a resulting marked improvement in the properties of the gelled product.

In some cases, however, it may not be necessary or desirable to use treating rolls such as illustrated in Fig. 3. In such instances, the gelled fiber may be led through the bath 22 merely with the aid of a guide roll or sheave to facilitate the passage of the fiber through the coagulating bath as is shown in Fig. 1 of the drawing accompanying my aforementioned copending application Serial No. 772,200. Or, the gelled fiber may be led through the bath 22 with the aid of a submerged, power-driven godet and multigroove roll as is shown in Fig. 1 of the present application. The latter arrangement permits a long bath travel by multiple winds of synthetic fiber without excessive tension on the fiber, such as may occur when a pair of multigroove rollers alone is used in leading the fiber through the bath. In such cases the gelled fiber is then stretched in the manner described hereinbefore.

With further reference to Fig. 3 the washed, gelled thread or fiber 134 is led from the discharge end of the converging rolls 118 to a godet 38 which has the same surface speed as that of the converging rolls. The fiber then passes through the hot aqueous liquid medium 40 contained in the stretch trough 42, and thence over the godet 44 and the auxiliary roller 46, about each of which the fiber is wrapped one or more (e. g., 2 or 3) times. If desired, the peripheral speed of the godet 38 may be slightly greater than that of the converging rolls 118. The washed, aquagel fiber 134 is stretched in the hot aqueous medium 40 in the same manner as has been described hereinbefore with reference to the stretching of the fiber 26 (Fig. 1).

The stretching operation, as it is applied to the fibers 26 and 134 (Figs. 1 and 3, respectively) or to the tow 88 (Fig. 2), is preferably effected (as shown in the several figures) while the fiber or tow is in a line which is tangent to two rotating circular surfaces and between which there is no other point of solid frictional contact, the peripheral speed of one of the said rotating surfaces being greater than that of the other thereby to maintain the gelled fiber or tow under tension. Other means by which this can be done are shown in Figs. 4, 5 and 6 of the drawing of my aforementioned copending application 73,078 and are fully described in the specification of that application with reference to these figures.

Referring again to Fig. 3 of the drawing of the present application, the stretched, oriented, gelled fiber 56 and one or more (e. g., from 2 to 100 or more) other continuous lengths of similarly produced, oriented, aquagel fibers or threads are continuously collected by means of the collecting ring 58 attached to the ring holder 60 to form the continuous tow 62. The stretched, undried, aquagel fibers constituting the tow 62, as ordinarily produced, contain between about 60% and about 70% (±1 or 2%), more particularly between 65% and 70%, by weight of water, the remainder consisting essentially of the oriented acrylonitrile polymerization product. This tow can be cut and dried to yield a crimped, staple fiber as has been described hereinbefore with reference to Fig. 1. Or, as shown by way of illustration in Fig. 3, the moisture content of the continuous tow can be reduced by partial drying to the point where the tow of wet fibers contains not less than about 13% by weight of water.

More particularly, the continuous tow 62 is led between the pinch rolls 136 and 137, thence between the pinch rolls 138 and 139, which rolls are revolving, as indicated, at about the same rates of peripheral speed as the godets 44 or only slightly faster, after which the tow is led through the drying oven 140 by means of the guide rolls 142 and the pinch rolls 144 and 145. The pinch rolls 144 and 145 revolve, as indicated, at the same peripheral speed as the pinch rolls 138 and 139, so that the partly dried tow 146 has substantially the same length as the gel tow 62. In general, the speed of the rolls is so adjusted that the tow 62 can be conveyed through the drying oven 140 to the cutter 66 while the continuous fibers constituting the tow are sufficiently taut that no marked crimping of the fiber can take place during this partial drying operation.

Any suitable means for partially drying the tow 62 in the oven 140 may be employed, for instance means such as were mentioned hereinbefore with reference to the drying of the cut fiber 68 (Fig. 1) in the oven 76. For instance, a hot gaseous medium such as hot air or hot flue gases can be introduced into the oven 140 through the conduit 148 and be discharged from the oven, together with moisture evaporated from the partly dried tow, through the conduit 150. In the oven 140 the continuous tow 62 is partly dried to the point where it contains not less than about 13%, preferably not less than about 40% (e. g., to about 45 or 50%), by weight of water. To attain this result, the temperature of the oven and the speed at which the tow 62 is passed therethrough are adjusted so that the partly dried tow leaving the oven contains the desired percentage of moisture. Oven temperatures within the range of for example, 50° or 60° C. to 100° C., or higher (e. g., 200° C. for a short time) can be used if desired. It will be understood, of course, by those skilled in the art that there is a time-temperature relationship in reducing the moisture content of the continuously moving tow to the desired percentage as it passes through the oven.

After leaving the oven 140 the partially dried tow 146 is led to the cutter 66 and by means of which the tow is cut into discontinuous lengths of partly dried fiber 152 as has been described hereinbefore with reference to Fig. 1 and the cutting of the continuous tow 62 into discontinuous lengths of fiber 68. The discontinuous lengths of partly dried fiber 152 are then dried completely, in a fully relaxed state, in the oven 76 as previously has been described with reference to the drying of the discontinuous lengths of undried fiber 68. The speed at which the cut fibers 68 or 152 are carried through the oven 76 by means of the continuous belt 74 and the temperature at which the oven is maintained are so adjusted that the cut fibers are substantially completely dried by the time they are discharged from the discharge end of the moving belt. For instance, the oven temperatures can be within ranges of from 50° or 60° C. to 100° C. or higher (e. g., 200° C. for a short time). Drying at the lowest possible temperatures consistent with operating and production economies are usually desirable. In no case should the oven temperature and the speed at which the cut fibers 68 or 152 are carried through the oven 76 be such that the fibers are heated so hot that the individual fibers stick together. In the case of fibers of polyacrylonitrile, such sticking tendencies may appear when the fibers reach a temperature of the order of 255°–305° C. The sticking temperatures of particular acrylonitrile copolymers will vary with the particular starting copolymer employed.

The fibers (not shown) obtained by completely drying the discontinuous lengths of partly dried fiber 152 are crimped, staple fibers in which the crimp is less pronounced (all other factors being the same) than the crimped fibers 82 (Fig. 1), but other useful properties are essentially the same as those of the fibers 82.

Anti-static finishing compositions can be applied, if desired, to the stretched, gelled fibers, for instance in the manner described in my aforementioned copending application Serial No. 68,370 with particular reference to Figs. 2, 3 and 4 of the drawing accompanying that application and in the manner there illustrated. Thus, the spun and stretched fiber or tow of fibers can be treated with a treating composition comprising an anti-static agent by continuously passing it through a trough through which is circulated an anti-static treating composition, which may be of the kind mentioned hereinafter. This trough may be of the kind shown in Figs. 1, 2 and 3 of the present application, but it will be understood, of course, that any suitable vessel or container, which will hold or through which can be circulated the anti-static treating composition and through which the fiber can be continuously passed as hereinbefore described in contact with the said composition, can be employed. The anti-static treating composition which is circulated through such a trough may be at any suitable temperature, e. g., within the range of about 40° C. to about 70° C. Circulation of the anti-static composition through the trough is effected in the same maner as has previously been described with reference to the circulation of water through the stretch bath or trough 42. After being treated with the liquid finishing composition containing the anti-static agent, the treated, stretched fiber in gel state is then further processed in the same manner as previously has been described with reference to the untreated fiber or tow of fibers.

Alternatively, instead of using separate baths for stretching the fiber or tow of fibers and for treating the same with a composition comprising an anti-static agent, both operations can be effected by continuously passing the gelled fiber or tow through a combination stretch and anti-static treating bath. During its passage through this bath the gelled product is stretched while the fiber or tow is in contact with a liquid medium comprising water, and, also, is simultaneously treated with an anti-static agent (numerous examples of which are given hereinafter), since such an agent likewise is a component of the liquid medium. The temperature of the liquid medium constituting the combined stretch and anti-static treating bath may be considerably varied, but is usually within the range of about 70° C. to about 100° C. The stretched gel, which has been treated with an anti-static agent conjointly with stretching to orient its molecules along the fiber axis, is then further processed in the same manner herein described with reference to the untreated fiber or tow of fibers.

Any suitable anti-static agent can be employed. Examples of anti-static agents which can be used are the guanylurea and guanidine salts of monoaliphatic hydrocarbon esters of sulfuric acid, more particularly such salts wherein the aliphatic hydrocarbon grouping contains from 12 to 18 carbon atoms, inclusive, e. g., guanylurea octadecyl hydrogen sulfate, guanidine octadecyl hydrogen sulfate, guanidine oleyl hydrogen sulfate, etc. Other examples of such guanylurea and guanidine salts which can be used as anti-static agents in practicing the present invention are given in my copending applications Serial No. 68,371 and Serial No. 68,372, both of which were filed December 30, 1948. Still other examples of anti-static agents which can be used are $\beta$-alkoxypropionitriles, e. g., octadecoxypropionitrile; reaction products of ethylene oxide and a long-chain alkyl guanamine, e. g., octadecyl guanamine; and reaction products of ethylene oxide and a long-chain alkyl guanidine, e. g., octadecyl guanidine.

It is not essential that the liquid treating composition, e. g., an aqueous dispersion, which is applied to the gelled fiber contain only an anti-static agent as the sole effect agent which is present in the composition. In some cases, however, it may be desirable or advantageous to use an anti-static agent alone as the sole effect agent, more particularly such agents which are inherently capable of functioning both as a lubricating agent and as an anti-static agent. In other cases it may be desirable to use the anti-static agent in conjunction with other conditioning or effect agents which are commonly employed in treating synthetic fibers, more particularly fibers produced from acrylonitrile polymerization products. Such auxiliary conditioning agents include mineral, vegetable and animal oils, among which latter may be mentioned blown and unblown neat's-foot oil, sperm oil, olive oil, teaseed oil, peanut oil, soya bean oil and cottonseed oil, as well as the various sulfonated oils, e. g., sulfonated olive oil. Examples of other conditioning agents that can be employed in conjunction with the aforementioned guanylurea salt or guanidine salt or other anti-static agent are wetting and dispersing agents and textile lubricants of various kinds, for instance N-octadecyl disodium sulfosuccinamate, dioctyl sodium sulfosuccinate, lecithin, esters of long-chain fatty acids, e. g., alkyl stearates, palmitates and oleates, more particularly the ethyl, propyl, butyl and amyl stearates, palmitates and oleates.

It will be understood, of course, by those skilled in the art that, in practicing the present invention, the solution of the polymeric or copolymeric acrylonitrile in the chosen solvent should be of such a concentration that a composition having a workable viscosity is obtained. The concentration of the polymerization product will depend, for example, upon the particular solvent and extrusion apparatus employed, the diameter of the fiber to be spun and the molecular weight of the polymerization product, which usually is within the range of 15,000 to 300,000, as calculated from viscosity measurements using the Staudinger equation, and advantageously is of the order of 40,000–60,000 (more particularly, about 50,000) to 140,000–160,000 (more particularly, about 150,000). The concentration of polymer or copolymer may range, for example, from 6 or 7% up to 18 or 20% by weight of the solution. The viscosity of the solution, as determined by measuring the time in seconds for a Monel metal ball $\frac{1}{8}$ inch in diameter to fall through 20 cm. of the solution at 61° C., can be, for instance, from 10 to 500 seconds. It has been found that the best spinning solutions from the standpoint of coagulation and optimum properties of the precipitated gel are those which contain the highest concentration of polymer and the lowest concentration of zinc chloride, sodium or calcium thiocyanate, guanidine thiocyanate or other salt of the kinds aforementioned, which concentrations are consistent with solubility and viscosity limitations. A concentration of 7–15% polymeric or copolymeric acrylonitrile in 50–60% sodium or calcium thiocyanate solution has been found to give very satisfactory results. The viscosity of the solution should not be so high that it is difficult to filter or to stir and de-aerate prior to use.

As has been pointed out hereinbefore and in my aforementioned copending applications Serial Nos. 772,200, 68,370 and 73,078 the temperature of the aqueous coagulating bath is critical in the formation of a useful, workable, polymeric or copolymeric acrylonitrile fiber. When the polymerization product is coagulated in water at a temperature substantially above +10° C., e. g., at 20° or 25° C. or higher, an opaque, weak, non-ductile structure results. This structure becomes increasingly weak and less transparent the higher the temperature of coagulation above about +10° C. However, by coagulating in a liquid coagulant comprising water at or below +10° C., e. g., in water at +1 to +5° C., or in an alcohol-water mixture at lower temperatures, e. g., at 0° to −10° C., the coagulated product is clear or substantially clear, cohesive, tough, ductile and capable of being oriented in its water-swollen or gel state. Generally speaking, the clearer the gelled or coagulated material, the greater its ductility.

I am unable to state with certainty the reasons why the use of a cold aqueous coagulating bath as described herein and in my aforementioned copending applications causes such a surprising change in the properties of the coagulated polymeric or copolymeric acrylonitrile. One logical explanation is that the low-temperature coagulation or precipitation of the extruded polymerization product results in the formation of a highly hydrated structure, possibly with water molecules held by secondary forces to the nitrile groups. Once this structure has been formed at low (subnormal) temperatures of the order of −15° C. to +10° C. it is quite stable when preserved under water at temperatures as high as 50° C., although coagulation or precipitation at temperatures materially above +10° C. results in a non-transparent, weak gel having little or no ductility.

In order that those skilled in the art better may understand how the present invention can be carried into effect, the following examples are given by way of illustration and not by way of limitation. All parts and percentages are by weight.

*Example 1*

To a solution at 40° C. comprising a mixture of 8774 parts of water, 914 parts of a 9.64% aqueous acrylamide solution and 792 parts of acrylonitrile was added with constant stirring 16 parts of sodium metabisulfite followed by 16 parts of ammonium persulfate, each being added as a concentrated aqueous solution. The polymerization was carried out in a jacketed vessel, and by applying cooling during the early stage of the polymerization the temperature of the reaction mass was held at 40° C. After a total of 2 hours the copolymer slurry was filtered, and the isolated copolymer was washed, dried and ball-milled. One gram of the dry copolymer, dissolved in a 60% aqueous sodium thiocyanate solution to make 100 ml. at 20° C., had a viscosity at 40° C. of 21.5 centipoises. The molecular weight of the copolymer was approximately 75,000 as determined from viscosity measurements using the Staudinger equation.

Seven parts of the dry copolymer powder was dissolved in 93 parts of a 50% aqueous calcium thiocyanate solution. After filtering and de-aerating, the solution had a viscosity of 18.5 seconds as determined by the time for a Monel ball, $\frac{1}{8}$-inch in diameter, to fall through 20 centimeters of the solution maintained at 61° C.

The solution was extruded through a 40-hole spinneret with holes of 90 microns diameter into water at 3° C. To assist in the extrusion the solution was heated to about 60° C. inside the spinneret by means of an electrical heating device such as that briefly described hereinbefore and more fully in my copending application Serial No. 772,200 with reference to Fig. 2 of the drawing accompanying that application. The solution was extruded downwardly at a rate of 6.86 grams per minute, and the multifilament fiber thereby formed was led first to a hook and thence upwardly to submerged rollers so that the total bath travel was 21 inches. The fiber was then led to a godet of 50 mm. diameter, hereafter referred to as G—1, around wihch the fiber was wrapped three times. Thereafter the fiber was led to a second godet of 125 mm. diameter, hereafter referred to as G—2, around which it was wrapped two times. G—1 and G—2 both rotated at 16 R. P. M., thereby applying a preliminary stretch of 2½ times to the fiber. From G—2 the fiber was led through a water bath at 98°–99° C. for a bath travel of 24 inches and thence to a 94.5 mm. diameter spool which rotated at 81 R. P. M. The stretch between G—2 and the spool was 3.83 times, and the overall stretch between G—1 and the spool was 9.6 times.

The stretched, continuous fiber was a tough, molecularly oriented, aquagel fiber having a denier/filament (dry) of 4.2. The wet, undried thread was cut while wet into lengths of 2.95 inches and was then bleached by immersing the discontinuous lengths for 1 hour in a 1% aqueous solution of hydrogen peroxide maintained at 120° F., followed by washing. The wet staple fiber, which was as yet uncrimped, was now dried in a current of air at 150° F. During drying the cut fibers acquired a high degree of crimp which gave a lofty hand to the dry, staple fiber. The denier/filament after drying (with shrinkage) was 4.9.

When immersed in water at 140° F. the staple fiber showed no loss of crimp and could be dried again to a lofty condition. Since 100° F. is generally considered as a standard temperature for washing wool, the results of this test show that the staple fiber would be suitable for uses in which the permanence of loftiness or resilience is important, such as in the fabrication of blankets, textiles and the like.

*Example 2*

A copolymer of 95% acrylonitrile and 5% methyl acrylate which copolymer had an average molecular weight of about 80,000, as determined from viscosity measurements using the Staudinger equation, was spun as a 7.12% solution in 48% aqueous calcium thiocyanate. The viscosity of this solution was 21.8 seconds as measured by the time for a Monel ball, ⅛ inch in diameter, to fall through 20 cm. of the solution at 61° C. The extruded thread was coagulated as described under Example 1 and then stretched 10.5 times in water at 98° C., after which the aquagel thread was wound on bobbins under tension. The aquagel thread was now allowed to come to equilibrium or desorb with air at various relative humidities at 70° F. with shrinkage prevented, after which the fiber was cut to form a staple fiber and dried in a fully relaxed state. The shrinkage and crimping at various moisture contents are tabulated below:

| Per Cent Relative Humidity | Per Cent Water in Aquagel Fiber | Per Cent Water Based on Bone-dry Fiber | Crimp in Staple Fiber |
|---|---|---|---|
| Wet aquagel | 68.4 | 215.0 | Good. |
| 100 | 40.5 | 68.0 | Do. |
| 90 | 22.8 | 29.5 | Fairly good. |
| 80 | 13.3 | 15.3 | Fair. |
| 72 | 8.8 | 9.8 | None. |
| 56 | 4.3 | 4.5 | Do. |
| 39.5 | 1.96 | 2.0 | Do. |

From the results tabulated above it is apparent that the degree of crimp is determined largely by the per cent of water in the aquagel fiber when it is allowed to dry under no tension; that is, in a fully relaxed state.

*Example 3*

The same aquagel thread that was produced and tested as described under Example 2 was used in this example. The continuous length of aquagel fiber was cut while wet into discontinuous lengths of staple fiber, which were then dropped into boiling water for 5 minutes. After removing from the hot water and drying, the cut staple fiber was found to have a good crimp. The luster was much less than the dried staple fiber which crimped by shrinkage during drying, as in Example 2. The shrinkage of the aquagel staple in boiling water was 29%.

*Example 4*

One part of acrylonitrile was dissolved in 14.68 parts of water at 40° C. To this solution were added 0.0075 part of sodium metabisulfite and 0.0075 part of ammonium persulfate. The polymerization mixture was held at 40° C. for 2 hours, at the end of which time the polyacrylonitrile was filtered off, purified by washing and dried. The average molecular weight of the polyacrylonitrile as calculated by means of the Staudinger equation from the viscosity of a solution of the polyacrylonitrile in dimethyl formamide was about 141,000.

One part of the polyacrylonitrile was dissolved in 13.28 parts of 48% aqueous calcium thiocyanate solution to give a solution which had a viscosity of 208 seconds as determined by the time for a Monel ball, ⅛ inch in diameter, to fall 20 cm. through the solution at 61° C. The calcium thiocyanate solution of the polyacrylonitrile was extruded, after preheating, through a multihole spinneret into water at 1°–2° C. The multifilament gel thread was led for a distance of 13 feet through the bath and then was stretched 715% in a water bath at 99° C.

The stretched gel thread was cut into 6-inch lengths and immersed in an emulsion maintained at 50° C. and containing 1% of guanidine octadecyl hydrogen sulfate (anti-static agent) and 0.5% of butyl stearate (lubricant). After this emulsion treatment the gel staple was dried loosely in a current of air. The dry polyacrylonitrile staple fiber acquired a good crimp during drying. This emulsion treatment yielded a dried, naturally crimped (self-crimped) staple fiber which did not become charged with static electricity during handling.

*Example 5*

One part of acrylonitrile was dissolved in 15.38 parts of water at 40° C. To this solution was added 0.00125 part of sodium metabisulfite and 0.00125 part of ammonium persulfate. The polymerization mixture was held at 40° C. for 2 hours, at the end of which time the polyacrylonitrile was separated by filtration, purified by washing and then dried. The average molecular weight of the polyacrylonitrile, as calculated by the method described under Example 4, was about 134,200.

One part of the polyacrylonitrile was dissolved in 13.3 parts of 48% aqueous calcium thiocyanate to give a solution having a viscosity of 143 seconds as determined by the time for a Monel ball, ⅛ inch in diameter, to fall through 20 cm. of the solution at 61° C. The calcium thiocyanate solution of the polyacrylonitrile was extruded, after being preheated to about 90° C. in the spinning head just before extrusion, through a multi-hole spinneret into a coagulating bath of water at 0.5° C. The thread was led through the coagulating bath for a distance of 13 feet and then was wrapped 2½ times around a godet. The gel thread was led from the coagulating bath through a stretch bath of water at 99° C. to a second godet around which it was wrapped three times. The second godet had a surface speed nine times that of the first godet. The stretched thread had a filament denier of 2.5. The stretched gel thread was cut into 6 inch lengths, which were then dropped into a dispersion of 0.5 gram per liter of an acetate red dye, more particularly 4-[di-(β-hydroxyethyl)-amino] - 2 - methyl-4'-nitroazobenzene, in water at 50° C. After agitating in this dye dispersion for 2 hours, the gel staple fiber was removed, washed with water, and allowed to dry loosely. An evenly dyed, well-crimped, staple fiber resulted after drying.

Example 6

A copolymer of allyl alcohol and acrylonitrile was prepared by first mixing 240 parts of dry acrylonitrile and 26.7 parts of allyl alcohol with 3667 parts of water. The temperature of the mixture was maintained at 40° C. One part of silver nitrate (0.375% based on the weight of the dry monomers) dissolved in 16.7 parts of water was added to the aqueous solution of monomers, followed immediately by the addition of 2 parts of ammonium persulfate (0.75% based on the weight of the dry monomers) dissolved in 16.7 parts of water. The mixture was stirred for 4 hours after adding the catalyst. The resulting acrylonitrile-allyl alcohol copolymer was filtered off, washed thoroughly with water, dried and ball-milled to a fine powder. The average molecular weight of the copolymer, as calculated by the method described under Example 4, was about 64,000. From the results of a nitrogen analysis it was calculated that the copolymer contained about 2.9% by weight of copolymerized allyl alcohol.

One part of this copolymer was dissolved in 13.3 parts of 48% aqueous calcium thiocyanate solution to form a spinning solution containing about 7% of copolymer. This solution was filtered and de-aerated prior to spinning.

The calcium thiocyanate solution of the copolymer was extruded, after being preheated to about 70°–80° C. in the spinning head just prior to extrusion, through a 40-hole spinneret with holes 120 microns in diameter into a coagulating bath of water maintained at from 1° to 2° C. The thread was led through the bath a distance of 240 cm. and was then stretched approximately 1150–1200% between two godets while immersed in water maintained at 98°–100° C.

The stretched gel of copolymer contained about 65.8% by weight of water. The continuous length of gelled fiber was cut into 6-inch lengths, a swatch of which was allowed to dry at room temperature in a fully relaxed state. The discontinuous lengths of aquagel fiber acquired a pronounced crimp during drying, and the substantially completely dried staple retained the natural crimp thereby produced.

Example 7

About 1958 parts of water was mixed with 133.3 parts of acrylonitrile at 9° C. The temperature was then raised to 40° C., and to the aqueous solution of the acrylonitrile was added 1 part of ammonium persulfate dissolved in 16.7 parts of water, followed immediately by 1 part of sodium metabisulfite also dissolved in 16.7 parts of water. After the reaction had proceeded for 5 minutes, a solution containing 2.5 parts of sodium sulfate dissolved in 8.3 parts of water was added. The reaction was continued with stirring at 40° C. for 2 hours after the addition of the catalyst. The resulting polyacrylonitrile was filtered off and washed with water until the wash water gave a negative test for sulfate ion with barium chloride. The washed polymer was dried and ball-milled to a fine powder. The average molecular weight of the polymer, as calculated by the method described under Example 4, was approximately 121,000.

One part of polyacrylonitrile prepared as described above was added to 15.7 parts of 52.5% aqueous calcium thiocyanate solution. The mixture was heated to 45° C. and stirred until all of the polymer had dissolved. The solution was then filtered and de-aerated for spinning.

The spinning solution was extruded, after being preheated to about 80° C. in the spinning head just prior to extrusion, through a 40-hole spinneret with 120 micron holes at a rate of 2.97 cc. per minute into a coagulating bath of water maintained at about 0°–1° C. The coagulated fiber or thread was then led into a bath of water maintained at about 99° C. and wherein the thread was stretched about 550% between two godets positioned outside the bath.

The continuous length of gelled fiber or thread was conditioned at 92% relative humidity for about 16 hours under tension sufficient to prevent shrinkage and thereby retain the original length. The moisture content of the conditioned fiber was then determined, the fiber was cut into 6-inch lengths, and the gelled staple fiber was allowed to dry at room temperature in a fully relaxed state. The results were as follows:

| Per Cent Relative Humidity | Per Cent Water in Aquagel Fiber | Per Cent Water Based on Bone-dry Fiber | Crimp in Staple Fiber |
|---|---|---|---|
| 92 | 18.7 | 23.0 | Fairly good. |

It will be understood, of course, by those skilled in the art that my invention is not limited to the specific polymerization products and solutions thereof, the specific conditions of spinning, or the specific methods of stretching the fiber or tow of fibers as described above and shown by way of illustration in the figures of the accompanying drawing. Thus, instead of the particular copolymers employed in certain examples I can use any other soluble, thermoplastic copolymers of acrylonitrile containing in the molecules thereof an average of at least about 85% by weight of combined acrylonitrile. Examples of such copolymers include copolymers containing in the molecules thereof from, by weight, 85 to 98 or 99% of acrylonitrile and from 15 to 1 or 2% of allyl alcohol, methallyl alcohol, acrylamide, methacrylamide or a lower alkyl acrylate (e. g., methyl, ethyl, propyl, butyl, etc. acrylate). Similar ranges of proportions also apply with respect to copolymers of acrylonitrile and other comonomers, numerous examples of which latter have been given hereinbefore.

If the staple fiber is to be treated with an antistatic agent, such an agent can be applied to the gelled fiber or tow of fibers by any suitable means, but preferably it is applied in the form of a liquid dispersion, more particularly an aqueous dispersion. This dispersion may contain any suitable amount of anti-static agent, but ordinarily such an agent is present in the dispersion in an amount corresponding to from about 0.5% to about 5% by weight thereof. The dispersion may be applied, for example, by immersing the fiber or tow in the dispersion, or by spraying or otherwise contacting the fiber or tow with the dispersion. In applying the dispersion, it is preferably heated to an elevated temperature, e. g., from about 45° or 50° C. to about 95° C., or in some cases even as high as 100° C. With some anti-static agents the dispersion containing the same may be applied at room temperature (20°–30° C.) or at temperatures up to 45° C., but such temperatures may be less desirable with other anti-static agents because of the greater difficulty in maintaining the anti-static agent homogeneously dispersed in water or other volatile liquid dispersion medium at the lower temperatures. The treated, gelled fiber or tow of fibers, either with or without partial drying as hereinbefore described with reference to the untreated material, is then cut into discontinuous lengths and dried in a fully relaxed state as previously has been mentioned. The amount of anti-static agent which is present in or on the crimped, dried, staple fiber may vary considerably, but ordinarily it is present therein or thereon in an amount, by weight, corresponding to from about 0.2% to about 4% of the dried, untreated staple fiber.

The anti-static finishing composition can be applied, of course, to the dried, crimped staple, but no particular advantages accrue therefrom.

If desired, the undried or partly dried gelled fiber can be dyed, e. g., with an acetate dye, after having been cut into discontinuous lengths and prior to the substantially complete drying of the same in a fully relaxed state to impart a natural crimp thereto; or the dried, crimped, staple fiber can be dyed. Other effect agents similarly can be applied to the undried or partly dried fiber prior to cutting to form the staple, or to the cut, dried, crimped staple, as desired or as conditions may require.

The present invention provides an effective and economical method of producing a crimped synthetic fiber from an acrylonitrile polymerization product containing in the molecules thereof an average of at least about 85% by weight of combined acrylonitrile. The crimp is imparted to the fiber without the necessity of mechanical (artificial) deformation of the fiber. The degree of crimp can be substantially varied merely by removing part of the water from the gelled fiber, while maintaining it in a taut condition, prior to drying the fiber substantially completely in a fully relaxed state. The crimp has a high order of permanency, and is not removed by ordinary laundering and dry-cleaning. As has been mentioned hereinbefore, the crimped staple has outstanding properties which render it eminently suitable for a wide variety of applications in the textile, rug-making, insulating and other arts.

I claim:

1. The method of producing a crimped, synthetic fiber from a soluble acrylonitrile polymerization product containing in the molecules thereof an average of at least about 85% by weight of combined acrylonitrile, said method comprising continuously extruding the said product in the form of a fiber from a water-coagulable solution thereof in a concentrated aqueous solution of a water-soluble salt which yields highly hydrated ions in aqueous solution; immediately after extrusion contacting the continuously moving, extruded mass with a liquid coagulant comprising water, said coagulant being at a temperature not exceeding +10° C., thereby to precipitate the said product from the said solution as a stretchable, gelled fiber; continuously stretching the said gelled fiber at least about 100% in the presence of moisture and at a temperature within the range of about 70° C. to about 110° C.; cutting the continuous length of stretched, shrinkable, aquagel fiber into discontinuous lengths while the said fiber contains, by weight, from about 13% to about 75% of water and correspondingly from about 87% to about 25% of the aforementioned polymerization product; and drying the discontinuous lengths of the cut fiber in a fully relaxed state thereby to obtain a crimped fiber of the said polymerization product.

2. A method as in claim 1 wherein the water-coagulable solution of the soluble acrylonitrile polymerization product is a solution of the said product dissolved in a concentrated aqueous solution of sodium thiocyanate.

3. The method of producing a staple, synthetic fiber having a natural crimp which comprises continuously spinning a water-coagulable solution of an acrylonitrile polymerization product containing in the molecules thereof an average of at least about 85% by weight of combined acrylonitrile into a liquid coagulant comprising mainly water, and said polymerization product being dissolved in a concentrated aqueous solution of a water-soluble salt which yields highly hydrated ions in aqueous solution, said coagulant being at a temperature within the range of −15° C. to +10° C., whereby a spun, stretchable fiber in aquagel state is obtained; continuously stretching the gelled fiber at least about 100% while passing through water maintained at a temperature of from about 70° C. to about 100° C.; continuously collecting a plurality of continuous lengths of the stretched fiber in the form of a continuous tow; cutting the said tow of the stretched, shrinkable, aquagel fiber into discontinuous lengths while the said fiber contains, by weight, from about 13% to about 75% of water and correspondingly from about 87% to about 25% of the aforementioned polymerization product; and drying the discontinuous lengths of the cut tow in a fully relaxed state thereby to obtain a staple, synthetic fiber having a natural crimp.

4. The method of producing a staple, synthetic fiber having a natural crimp which comprises continuously spinning a water-coagulable solution of an acrylonitrile polymerization product containing in the molecules thereof an average of at least about 85% by weight of combined acrylonitrile into a liquid coagulant comprising mainly water, and said polymerization product being dissolved in a concentrated aqueous solution of a water-soluble salt which yields highly hydrated ions in aqueous solution, said coagulant being at a temperature within the range of −15° C. to +15° C., whereby a spun, stretchable fiber in aquagel state is obtained; continuously collecting a plurality of continuous lengths of the said stretchable fiber in the form of a continuous tow; continuously stretching the said tow of stretchable, gelled fibers at least about 100% while passing through water maintained at a temperature of from about 70° C. to about 100° C.; cutting the stretched tow of continuous, shrinkable, aquagel fibers into discontinuous lengths while the tow contains, by weight, from about 13% to about 75% of water; and drying the discontinuous lengths of the cut tow in a fully relaxed state thereby to obtain a staple, synthetic fiber having a natural crimp.

5. The method of producing a crimped, synthetic fiber from a viscous, water-coagulable solution of an acrylonitrile polymerization product containing in the molecules thereof an average of at least about 85% by weight of combined acrylonitrile, said polymerization product being dissolved in a concentrated aqueous solution of a water-soluble metallic salt which yields highly hydrated ions in aqueous solution, and said method comprising heating the said solution at a temperature sufficiently high to reduce its viscosity; continuously extruding the said solution while thus being heated in the form of a fiber; immediately after extrusion immersing the continuously moving, extruded fiber in a liquid coagulant comprising mainly water, said coagulant being at a temperature not higher than about +5° C., thereby to obtain a gelled stretchable fiber; continuously stretching the gelled fiber at least about 100% in the presence of water, at a temperature within the range of about 70° C. to about 100° C. and while it is in a line which is tangent to two rotating circular surfaces and between which there is no other point of solid frictional contact, the peripheral speed of one of the said rotating surfaces being greater than that of the other thereby to maintain the gelled fiber under a tension sufficient to stretch it at least about 100%; cutting the continuous length of stretched, shrinkable, aquagel fiber into discontinuous lengths while the said fiber contains, by weight, from about 40% to about 75% of water and correspondingly from about 60% to about 25% of the aforementioned polymerization product; and drying the discontinuous lengths of the cut fiber in a fully relaxed state thereby to obtain a crimped fiber of the said polymerization product.

6. A method as in claim 5 wherein the polymerization product is dissolved in a concentrated aqueous solution of a water-soluble thiocyanate.

7. The method of producing a crimped, staple, synthetic fiber from a water-coagulable solution of an acrylonitrile polymerization product containing in the molecules thereof an average of at least about 85% by weight of combined acrylonitrile, said polymerization product being dissolved in a concentrated aqueous solution of a water-soluble thiocyanate, and said method comprising continuously spinning the said water-coagulable solution into a spinning bath maintained at a temperature not exceeding +10° C. and comprising mainly water, whereby a spun, stretchable fiber in gel state is obtained; applying to the said gelled fiber, while it is continuously moving in a helical path, a liquid treating agent comprising water, said treating agent being at a temperature not exceeding +10° C.; continuously stretching the treated gelled fiber at least about 100% in the presence of moisture and at a temperature within the range of about 70° C. to about 110° C.; collecting a plurality of continuous lengths of the stretched fiber in the form of a continuous tow; cutting the said tow of the stretched, shrinkable, aquagel fiber into discontinuous lengths while the said fiber contains, by weight, from about 40% to about 75% of water and correspondingly from about 60% to about 25% of the aforementioned polymerization product; and drying the discontinuous lengths of the cut tow in a fully relaxed state thereby to obtain a crimped, staple fiber of the said polymerization product.

8. A method as in claim 7 wherein the water-soluble thiocyanate is calcium thiocyanate and the tow of stretched, shrinkable, aquagel fiber is cut into discontinuous lengths while the said fiber contains, by weight, from about 60% to about 70% of water.

9. The method of producing a crimped, stable, synthetic fiber from a water-coagulable solution of an acrylonitrile polymerization product containing in the molecules thereof an average at least about 85% by weight of combined acrylonitrile, said polymerization product being dissolved in a concentrated aqueous solution of a water-soluble thiocyanate, and said method comprising continuously spinning the said water-coagulable solution into a spinning bath maintained at a temperature not exceeding +10° C. and comprising mainly water, whereby a spun, stretchable fiber in gel state is obtained; applying to the said gelled fiber, while it is continuously moving in a helical path, a liquid treating agent comprising water, said treating agent being at a temperature not exceeding +10° C.; continuously collecting a plurality of continuous lengths of the treated, stretchable fiber in the form of a continuous tow; continuously stretching the said tow of stretchable, gelled fibers at least about 100% in the presence of moisture and at a temperature within the range of about 70° C. to about 110° C.; cutting the stretched tow of continuous, shrinkable, aquagel fibers into discontinuous lengths while the tow contains, by weight, from about 40% to about 75% of water and correspondingly from about 60% to about 25% of the aforementioned polymerization product; and drying the discontinuous lengths of the cut tow in a fully relaxed state thereby to obtain a crimped, staple fiber of the said polymerization product.

10. The method of producing a crimped, staple, synthetic fiber which comprises spinning a water-coagulable solution of an acrylonitrile polymerization product containing in the molecules thereof an average of at least about 85% by weight of combined acrylonitrile, said polymerization product having a molecular weight within the range of about 15,000 to about 300,000 as calculated from viscosity measurements using the Staudinger equation and being dissolved in a concentrated aqueous solution of a water-soluble thiocyanate, and said solution being spun into a spinning bath maintained at a temperature within the range of —15° C. to +10° C. and comprising mainly water, whereby a spun, stretchable fiber in gel state is obtained; applying to the said gelled fiber, while it is continuously moving in a helical path in contact with a smooth rotating surface, water at a temperature of from about 0° C. to not higher than +10° C. thereby to remove from the said gelled fiber any of the said thiocyanate which may still be present therein or thereon; continuously stretching the treated gelled fiber at least about 200% while being contacted with water maintained at a temperature within the range of about 90° C. to about 100° C. and while it is in a line which is tangent to two rotating circular surfaces and between which there is no other point of solid frictional contact, the peripheral speed of one of the said rotating surfaces being greater than that of the other thereby to maintain the gelled fiber under tension; continuously collecting a plurality of continuous lengths of the stretched fiber in the form of a continuous tow; cutting the said tow of the stretched, shrinkable, aquagel fiber into discontinuous lengths while the said fiber contains, by weight, from about 40% to about 75% of water; and drying the discontinuous lengths of the cut tow in a fully relaxed state thereby to obtain a crimped, staple fiber of the said polymerization product.

11. A method as in claim 10 within the acrylonitrile polymerization product has a molecular weight within the range of about 50,000 to about 150,000 and constitutes from about 7% to about 20% by weight of the solution of the water-soluble thiocyanate, the water-coagulable solution of the acrylonitrile polymerization product has a viscosity within the range of from about 10 seconds to about 500 seconds, as determined by measuring the time in seconds for a Monel metal ball having a diameter of ⅛ inch to fall through 20 cm. of the solution at 60° C., and the tow of stretched, shrinkable, aquagel fiber is cut into discontinuous lengths while the said fiber contains, by weight, from about 60% to about 70% of water.

12. The method of producing a crimped, staple, synthetic fiber which comprises continuously spinning a water-coagulable solution of an acrylonitrile polymerization product containing in the molecules thereof an average at least about 85% by weight of combined acrylonitrile, said polymerization product having a molecular weight within the range of about 50,000 to about 150,000 as calculated from viscosity measurements using the Staudinger equation, being dissolved in a concentrated aqueous solution of a water-soluble thiocyanate and constituting from about 7% to about 20% by weight of the said solution, and said water-coagulable solution being continuously spun into a spinning bath composed essentially of water maintained at a temperature within the range of about 0° C. to about +5° C. whereby a spun, stretchable fiber in gel state is obtained; applying to the said gelled fiber, while it is continuously moving in a helical path in contact with a smooth rotating surface, a liquid treating agent consisting essentially of water cooled to a temperature within the range of about 0° C. to about +5° C.; continuously stretching the treated gelled fiber from about 200% to about 2000% while passing through a bath composed essentially of water heated to a temperature within the range of about 90° C. to about 100° C. and while it is in a line which is tangent to two rotating circular surfaces each of which is positioned outside the said bath and between which there is no other point of solid frictional contact, the peripheral speed of one of the said rotating surfaces being greater than that of the other thereby to maintain the gelled fiber under a tension sufficient to stretch it from about 200% to about 2000%; continuously collecting a plurality of continuous lengths of the stretched fiber in the form of a continuous tow; cutting the said tow of the stretched, shrinkable, aquagel fiber into discontinuous lengths while the said fiber contains, by weight, from about 60% to about 70% of water; and drying the discontinuous lengths of the cut tow in a fully relaxed state thereby to obtain a crimped, staple fiber of the said polymerization product.

ARTHUR CRESSWELL.

REFERENCES CITED

The following references are of record in the file of this patent:

UNITED STATES PATENTS

| Number | Name | Date |
| --- | --- | --- |
| 2,140,921 | Rein | Dec. 20, 1938 |
| 2,153,031 | Zetzsche et al. | Apr. 4, 1939 |
| 2,197,896 | Miles, Jr. | Apr. 23, 1940 |
| 2,208,632 | Dreyfus | July 23, 1940 |
| 2,210,771 | Robertson | Aug. 6, 1940 |
| 2,217,113 | Hardy | Oct. 8, 1940 |
| 2,249,756 | Finzel | July 22, 1941 |
| 2,277,782 | Rugeley | Mar. 31, 1942 |
| 2,278,888 | Lewis | Apr. 7, 1942 |
| 2,327,087 | Austin | Aug. 17, 1943 |
| 2,420,565 | Rugeley et al. | May 13, 1947 |

OTHER REFERENCES

"Textile World," March 1947. An article on "Acrylonitriles" by Sherman, pages 101, 102, 215 and 216.